United States Patent
Keyes et al.

(10) Patent No.: US 12,252,849 B2
(45) Date of Patent: Mar. 18, 2025

(54) ACTIVE PATH MONITORING CONTROL SYSTEM AND METHOD FOR COMPACTOR

(71) Applicant: Caterpillar Paving Products Inc., Brooklyn Park, MN (US)

(72) Inventors: Joshua David Keyes, Saint Michael, MN (US); David Edwin Gerding, Maple Grove, MN (US); John L. Marsolek, Watertown, MN (US); Nathaniel S. Doy, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 330 days.

(21) Appl. No.: 17/716,458

(22) Filed: Apr. 8, 2022

(65) Prior Publication Data
US 2023/0323612 A1    Oct. 12, 2023

(51) Int. Cl.
*E01C 19/00* (2006.01)
*G05D 1/00* (2006.01)
*G05D 1/02* (2020.01)
*E01C 19/28* (2006.01)

(52) U.S. Cl.
CPC ......... *E01C 19/004* (2013.01); *G05D 1/0214* (2013.01); *G05D 1/0219* (2013.01); *E01C 19/282* (2013.01)

(58) Field of Classification Search
None
See application file for complete search history.

(56) References Cited

U.S. PATENT DOCUMENTS

| | | | |
|---|---|---|---|
| 5,471,391 A | 11/1995 | Gudat et al. | |
| 6,088,644 A * | 7/2000 | Brandt | E02F 3/842 701/50 |
| 6,112,143 A | 8/2000 | Allen et al. | |
| 7,491,014 B2 | 2/2009 | Sick | |
| 9,267,245 B1 * | 2/2016 | Braun | B62D 12/00 |

(Continued)

FOREIGN PATENT DOCUMENTS

| | | | |
|---|---|---|---|
| DE | 102019002442 | 10/2020 | |
| WO | WO-2013087256 A1 * | 6/2013 | A01B 79/005 |

OTHER PUBLICATIONS

Machine translation of WO-2013087256-A1 (Year: 2013).*

*Primary Examiner* — Amelia Vorce
*Assistant Examiner* — Kyle S Park

(57) ABSTRACT

Various control systems and methods for a working machine such as a compactor are disclosed. The control system can include any one or combination of components including a controller in communication with at least a steering system and a position sensor. The controller can be configured to: receive position data from the position sensor including during operator implemented steering of the compactor, save the position data to a memory, determine from the position data saved in the memory a possible intent by an operator to create a compaction area, generate a prompt on an operator interface to confirm an actual intent of the operator, and generate a compaction plan for autonomously steering the compactor to compact in the compaction area. The compaction plan can be based at least partially upon the operator implemented steering of the compactor. The controller can implement the compaction plan via autonomous steering.

17 Claims, 10 Drawing Sheets

(56) References Cited

U.S. PATENT DOCUMENTS

| | | |
|---|---|---|
| 9,982,397 B2 | 5/2018 | Korb et al. |
| 11,054,831 B2 | 7/2021 | O'donnell et al. |
| 2012/0173090 A1* | 7/2012 | Corcoran ............. G06Q 10/063 |
| | | 701/1 |
| 2016/0091898 A1* | 3/2016 | Booher ................ G05D 1/0221 |
| | | 701/26 |
| 2019/0186094 A1* | 6/2019 | Marsolek ................ E02D 3/046 |
| 2021/0278860 A1 | 9/2021 | Mcgee et al. |

* cited by examiner

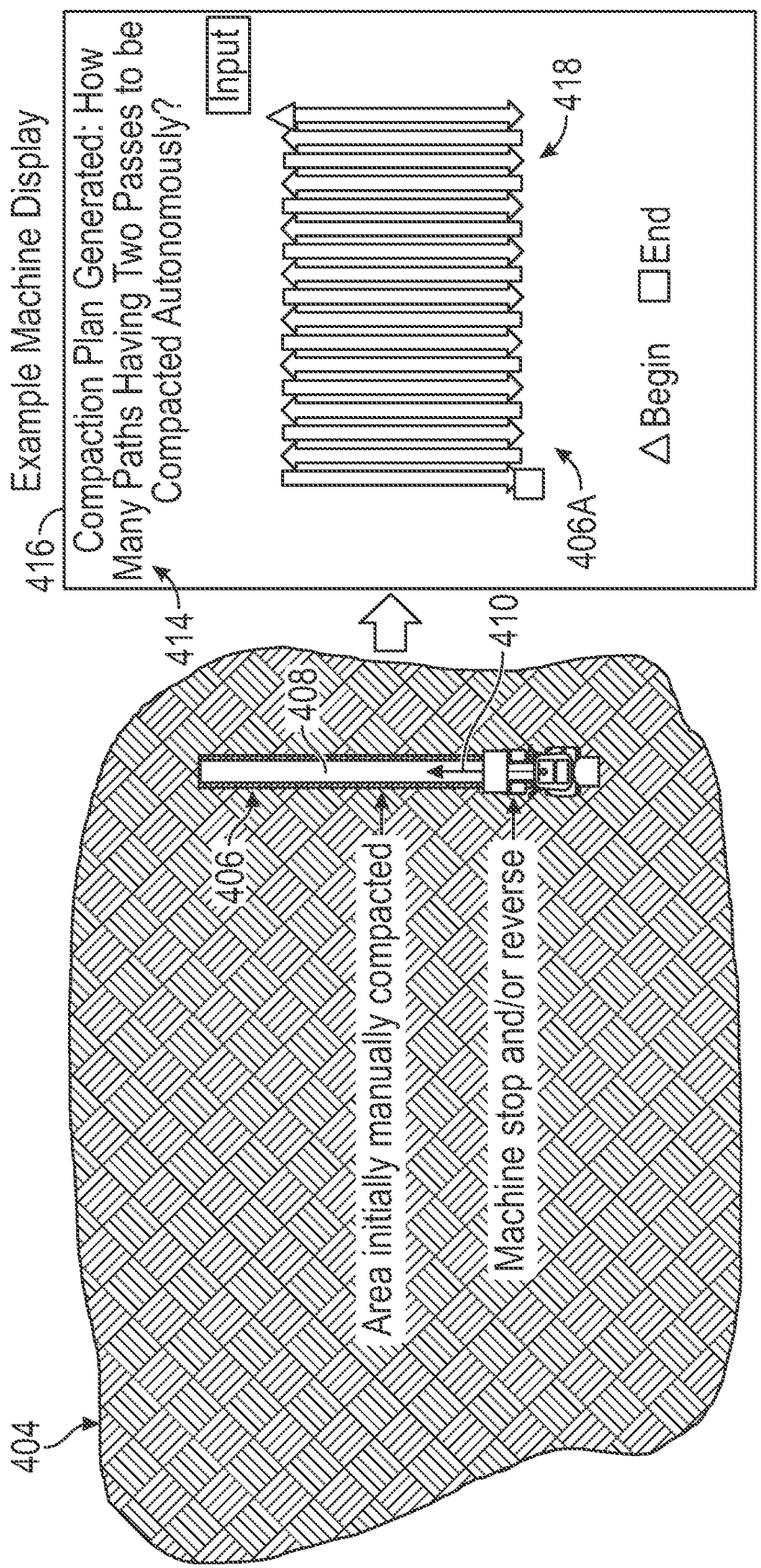

ACTIVE PATH MONITORING CONTROL SYSTEM AND METHOD FOR COMPACTOR

TECHNICAL FIELD

The present disclosure generally relates to a control systems and methods for a work machine. More particularly, the present disclosure relates to control systems and methods for facilitating autonomous operation by a compactor.

BACKGROUND

Work machines, such as compactors, can be used for compacting substrates. Compactors are employed for compacting soil, gravel, fresh laid asphalt, and other compactable materials associated with worksite surfaces. For example, during construction of roadways, highways, parking lots and the like, one or more compactors are typically utilized to compact soil, stone, and/or recently laid asphalt.

To assist with the compaction process and to improve compaction quality, a compactor may be equipped to operate in an autonomous or semi-autonomous mode by establishing a perimeter as described in in U.S. Pat. Nos. 6,112,143A and 11,054,831B2. In such modes of operation, the compactor operates at least in part under computer control. In preparation for computer control, the control system obtains geographical coordinates of its position such as via a Global Positioning System (GPS). A perimeter of a worksite can be obtained using the geographical coordinates. The control system then develops a compaction plan including paths for traversing the surface of the compaction area while performing compacting.

Various methods for defining a boundary for a compaction area are known and use a methodology as described above using safety or buffer zones. Examples of such methodology (in addition to U.S. Pat. Nos. 6,112,143A and 11,054,831B2) include U.S. Pat. Nos. 9,982,397 and 7,491,014, United States Patent Application Publication No. 2020/0089230 and German Patent Application No. DE102019002442A1. These examples all result in the compaction area being defined by a virtual boundary. However, the present case has a different focus and is not primarily concerned with generating a virtual boundary.

SUMMARY

In an example according to this disclosure, a control system is disclosed that can include any one or combination of including a position sensor sensing a position of a compactor, a steering system configured for both operator implemented steering and autonomous steering of the compactor, and a controller in communication with at least a steering system and a position sensor. The controller can be configured to: receive position data from the position sensor including during operator implemented steering of the compactor, save the position data to a memory, determine from the position data saved in the memory a possible intent by an operator to create a compaction area, generate a prompt on an operator interface to confirm an actual intent of the operator, and generate a compaction plan for autonomously steering the compactor to compact in the compaction area. The compaction plan can be based at least partially upon the operator implemented steering of the compactor. The controller can implement the autonomous steering of the compactor within the compaction area according to the compaction plan.

In one example, a machine implemented method of controlling operation of a compactor is disclosed. The method can include any one or combination of: recording a position of the compactor while operating the compactor to manually steer along a path, determining, with an electronic controller, a possible intent by an operator to create a compaction area using the recording of the position, confirming an actual intent of the operator, generating, with the electronic controller, a compaction plan for autonomously steering the compactor to compact in the compaction area, wherein the compaction plan is based upon the recording of the position of the compactor, and implementing, with the electronic controller, the autonomous steering of the compactor within the compaction area according to the compaction plan.

In one example, a compactor is disclosed. The compactor can include any one or combination of: a substantially cylindrical drum configured to compact a surface as the compactor traverses a compaction area, a frame supporting the drum, a steering system configured for both operator implemented steering and autonomous steering of the compactor, a position sensor sensing a position of the compactor, and a controller. The controller can be in communication with at least the steering system and the position sensor. The controller can be configured to: receive position data from the position sensor including during operator implemented steering of the compactor, save the position data to a memory, determine from the position data saved in the memory a possible intent by an operator to create a compaction area, generate a prompt on an operator interface to confirm an actual intent of the operator, and generate a compaction plan for autonomously steering the compactor to compact in the compaction area. The compaction plan can be based at least partially upon the operator implemented steering of the compactor. The controller can implement the autonomous steering of the compactor within the compaction area according to the compaction plan.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 3, 4, 5, 6, 7 and 8 are schematic diagrams of the compactor operating in a compaction area under operator control to perform compaction in accordance with examples of the present disclosure.

FIGS. 3A, 4A, 5A, 6A, 7A and 8A are a schematic diagrams of compaction plans for autonomous operation of the compactor generated using a control system and method and based upon the operator performed compaction of FIGS. 3, 4, 5, 6, 7 and 8, respectively, in accordance with examples of the present disclosure.

DETAILED DESCRIPTION

Figure 1:
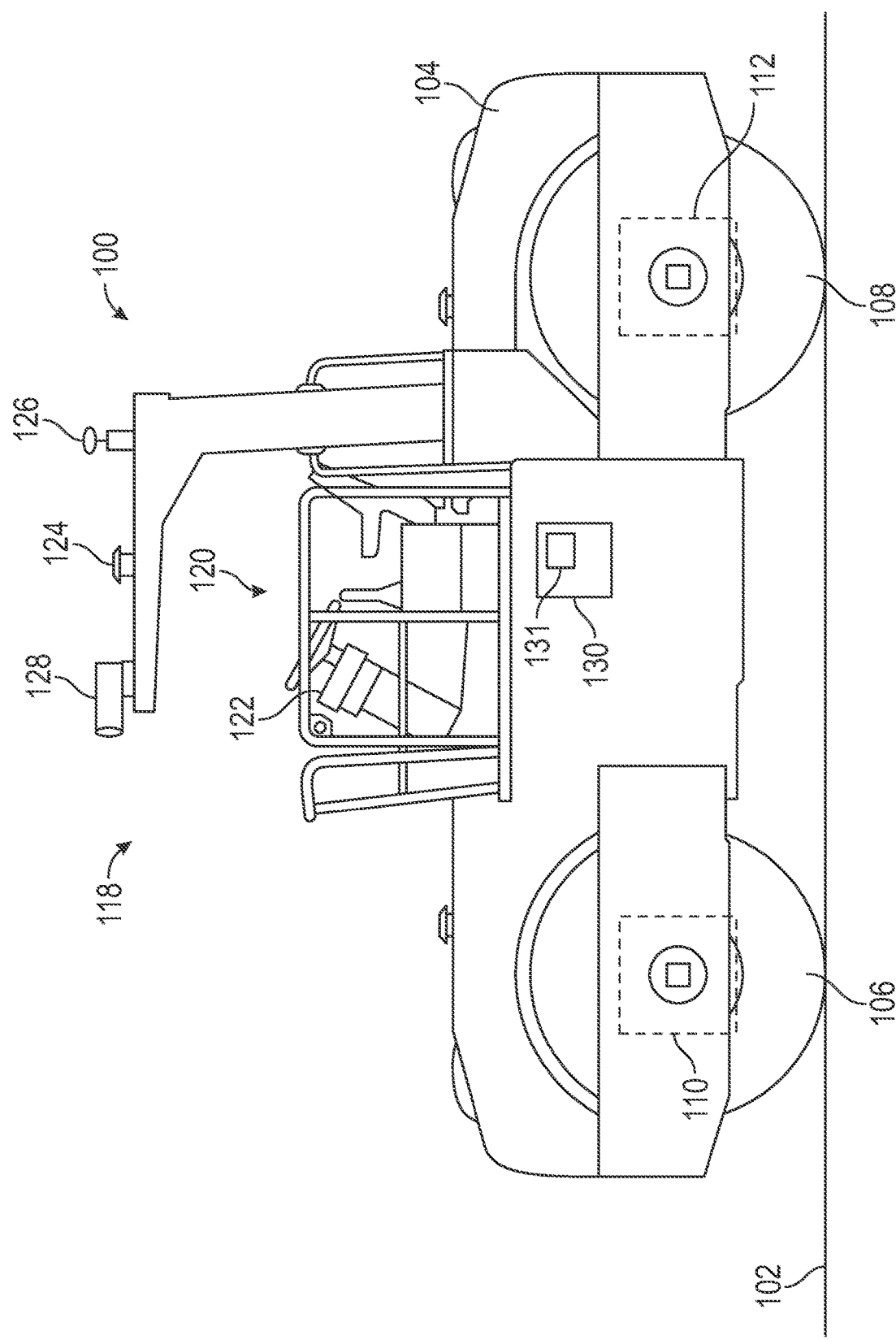
FIG. 1 is a side view of a compactor in accordance with an example of the present disclosure.

FIG. 1 shows a side view of a work machine, such as an example compactor 100, in accordance with one embodiment. The compactor 100 may be configured for use in, for example, road construction, highway construction, parking lot construction, and other paving, soil compaction and/or construction applications. For example, the compactor 100 may be used in situations where it is necessary to compress loose stone, gravel, soil, sand, concrete, and/or other materials of a worksite surface 102 to a state of greater compaction and/or density. Similarly, the compactor 100 can compress freshly deposited asphalt or other materials disposed on and/or associated with the worksite surface 102. As the compactor 100 traverses the worksite surface 102, vibrational forces generated by the compactor 100 and imparted to the worksite surface 102, acting in cooperation with the weight of the compactor 100, compresses the loose materials. The compactor 100 typically makes one or more passes over the worksite surface 102 to provide a desired level of compaction. Although described subsequently in reference to the compactor 100, the methods, systems, techniques of the present application are equally applicable to other working machines such earth moving equipment, mining equipment and other paving equipment that operate in a defined worksite area where a defined worksite periphery is desired.

The compactor 100 includes a frame 104, a first drum 106, and a second drum 108. The first drum 106 and the second drum 108 are rotatably coupled to the frame 104 so that the first drum 106 and the second drum 108 roll over the worksite surface 102 as compactor 100 travels. The first and second drums 106, 108 comprise substantially cylindrical drums and/or other compaction elements of the compactor 100, and the first and second drums 106, 108 can be configured to apply vibration and/or other forces to the worksite surface 102 in order to assist in compacting the worksite surface 102. Although illustrated in FIG. 1 as having first and second drums 106 and 108, according to other examples the compactor 100 can have only a single drum or three or more drums. Although the first and second drums 106 and 108 are shown with a substantially smooth circumference or outer surface, in other examples, the first drum 106 and/or the second drum 108 may be tapered and/or can include ground engaging tools such as teeth, pegs, extensions, pads, or other features. Such ground-engaging tools can assist in breaking-up at least some of the materials associated with the worksite surface 102 and/or otherwise assist in compacting the worksite surface 102.

The first drum 106 can have the same or different construction as the second drum 108. In some examples, the first drum 106 and/or the second drum 108 is an elongated, hollow cylinder with a cylindrical drum shell that encloses an interior volume. The first drum 106 defines a first central axis about which the first drum 106 rotates, and similarly, the second drum 108 defines a second central axis about which the second drum 108 rotates.

The first drum 106 can include a first vibratory mechanism 110 within the cylindrical drum shell, and the second drum 108 can include a second vibratory mechanism 112 within the cylindrical drum shell. While the first drum 106 is illustrated as having a first vibratory mechanism 110 and second drum 108 is illustrated as having a second vibratory mechanism 112, in other examples only one of the first and second drums 106, 108 may include a vibratory mechanism. The first and second vibratory mechanisms 110, 112 may include one or more weights or masses disposed at a position off-center from the respective central axis around which the first and second drums 106, 108 rotate. As first and second drums 106, 108 rotate, the off-center or eccentric positions of the masses induce oscillatory or vibrational forces to the first and second drums 106, 108, and such forces are imparted to the worksite surface 102. The weights are eccentrically positioned with respect to the respective central axis around which first and second drums 106, 108 rotate, and such weights are typically movable with respect to each other (e.g., about the respective central axis) to produce varying degrees of imbalance during rotation of first and second drums 106, 108. The amplitude of the vibrations produced by such an arrangement of eccentric rotating weights may be varied by modifying and/or otherwise controlling the position of the eccentric weights with respect to each other, thereby varying the average distribution of mass (i.e., the centroid) with respect to the axis of rotation of the weights. The present disclosure is not limited to these examples described above.

The compactor 100 of FIG. 1 is purely exemplary and can include other configurations (e.g., tow-behind, pushed, belt, etc.). The compactor 100 can be autonomous or semi-autonomous. The compactor 100 can be equipped with various sensors making autonomous or semi-autonomous operation feasible including those that can sense obstacle(s) adjacent the compactor 100. The various sensors can include one or more compaction sensors as known in the art to determine type of material, material density, material stiffness, and/or other characteristics of worksite surface 102. One or more sensors can also measure a vibration amplitude, a vibration frequency, a speed of the eccentric weights associated with first drum 106 and/or the second drum 108, a distance of such eccentric weights from the axis of rotation, a speed of rotation of the first drum 106 and/or the second drum 108, etc.

The compactor 100 includes an operator station 118. However, the operator station 118 is not contemplated if the compactor 100 is truly fully autonomous. The operator station 118 includes a steering system 120 including a steering wheel, levers, pedals, and/or other controls (not shown) for steering the compactor 100 along a desired path of travel. The operator station 118 can have components and/or systems that are not specifically shown such as a throttle, brake system, etc. for operation of the compactor 100. Using the operator station 118, an operator of compactor 100 can adjust a speed, travel direction, and/or other aspects of compactor 100 during use.

The operator station 118 also includes a control interface 122 (sometimes called an operator interface herein) for controlling various functions of compactor 100. However, in some examples it is contemplated that control interface 122 can be remote and offboard of the compactor 100. The control interface 122 comprises one or more an analog, digital, and/or touchscreen displays. The control interface 122 can be configured to display, for example, at least part of a travel path, a compaction plan and/or at least part of a virtual boundary according to examples of the present disclosure. The control interface 122 can support other functions, including for example, querying the operator regarding compaction intent as further discussed herein, displaying various operating data and communicating with various systems onboard and offboard the compactor 100.

The compactor 100 further includes one or more position sensors 124. These can be located in any position on the compactor 100 such as on the frame 104. The one or more position sensors 124 can determine a location of compactor 100 and can comprise a component of a global positioning system (GPS), cellular system, real time location system (RTLS), radio-frequency identification technology (RFID), or other position identifying technology as known in the art. In one example, the one or more position sensors 124 comprise a GPS receiver, a GPS transmitter, a GPS transceiver or other such device, and the one or more position sensors 124 can be in communication with one or more GPS satellites (not shown) to determine a location of the compactor 100. Such determination of the location and/or recording of the location of the compactor 100 can be controlled by the controller 130 and then utilized for autonomous operation as further described herein.

The compactor 100 may also include a communication device 126 configured to enable the compactor 100 to communicate with the one or more other machines, and/or with one or more remote servers, processors, or control systems located remote from the worksite at which the compactor 100 is being used. The communication device 126 can also be configured to enable the compactor 100 to communicate with one or more electronic devices located at the worksite. In some examples, the communication device 126 includes a receiver configured to receive various electronic signals including position data, navigation commands, real-time information, and/or project-specific information. In some examples, the communication device 126 is also configured to receive signals including information indicative of compaction requirements specific to the worksite surface 102. Such compaction requirements may include, for example, a number of passes (e.g., completed compactions following a specific route) associated with the worksite surface 102 and required in order to complete the compaction of worksite surface 102, a desired stiffness, density, and/or compaction of the worksite surface 102, a desired level of efficiency for a corresponding compaction operation, and/or other requirements. The communication device 126 may further include a transmitter configured to transmit position data indicative of a relative or geographic position of the compactor 100, as well as electronic data such as data acquired via one or more sensors of the compactor 100.

The compactor 100 optionally can include one or more obstacle detection sensors 128. These can include one or more of a camera, LiDAR, radar, and/or ultrasonic sensor(s) as known in the art. If a camera is utilized such camera can be a digital camera capable of various uses in addition to obstacle detection. The camera can provide visual feeds such as to record and/or transmit digital video of the worksite surface 102, obstacle(s) in or adjacent the worksite in real-time. In still other examples, camera can comprise an infrared sensor, a thermal camera, or other like device configured to record and/or transmit thermal images of the worksite surface 102 in real-time.

The compactor 100 also includes a controller 130 in electronic communication with various components including the steering system 120, control interface 122, one or more position sensors 124, communication device 126, one or more obstacle detection sensors 128, and/or other components of compactor 100. The controller 130 receives one or more signals from the one or more position sensors 124 including information indicating a location of compactor 100. In some examples, the controller 130 using position data from one or more position sensors 124 may be configured to continuously in real-time or near real-time determine a location of compactor 100 as compactor 100 traverses the compaction area under operator control of worksite surface 102 and/or as compactor 100 travels to any other worksite location. Thus, the receiving of position, saving of the position and determining the position of the compactor 100 can be performed in a continuous or near continuous manner including during operator initiated and controlled compaction using the steering system 120. The controller 130 via the control interface 122 can in some instances be used to initiate communication with the operator to query the operator and initiate autonomous operation of the steering system 120 to guide the compactor 100 during compaction as further discussed herein. The location of compactor 100 can include GPS or other position coordinates such as a plurality of distinct points, a plurality of points along two or more steered paths (e.g., substantially parallel travel paths), or other position data related to operation the compactor 100 by the operator using the steering system 120. Such position data may be determined substantially continuously during movement of compactor 100 as discussed above. Alternatively, such position data may be received and/or determined at regular time intervals (milliseconds, one second, two seconds, five seconds, ten seconds, etc.) as the compactor 100 travels. Further, any such information can be stored in a memory associated with controller 130 as discussed below.

The controller 130 can be part of a broader control system that can include additional components including some of those already discussed. The controller 130 can include, for example, software, hardware, and combinations of hardware and software configured to execute several functions related to, among others, obstacle detection for the compactor 100. The controller 130 can be an analog, digital, or combination analog and digital controller including a number of components. As examples, the controller 130 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry. Commercially available microprocessors can be configured to perform the functions of the controller 130. Various known circuits may be associated with controller 130, including power supply circuitry, signal-conditioning circuitry, actuator driver circuitry (i.e., circuitry powering solenoids, motors, or piezo actuators), and communication circuitry. In some examples, the controller 130 may be positioned on the compactor 100, while in other examples the controller 130 may be positioned at an off-board location (remote location) relative to the compactor 100.

The controller 130 can include a memory 131 such as memory circuitry. The memory 131 may include storage media to store and/or retrieve data or other information such as, for example, input data from the one or more position sensors 124, the communication device 126 and/or the one or more obstacle detection sensors 128, etc. Storage devices, in some examples can be a computer-readable storage medium. The data storage devices can be used to store program instructions for execution by processor(s) of the controller 130, for example. The storage devices, for example, are used by software, applications, algorithms, as examples, running on and/or executed by the controller 130. The storage devices can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random-access memories (DRAM), static random-access memories (SRAM), and other forms of volatile memories known in the art.

Figure 2:
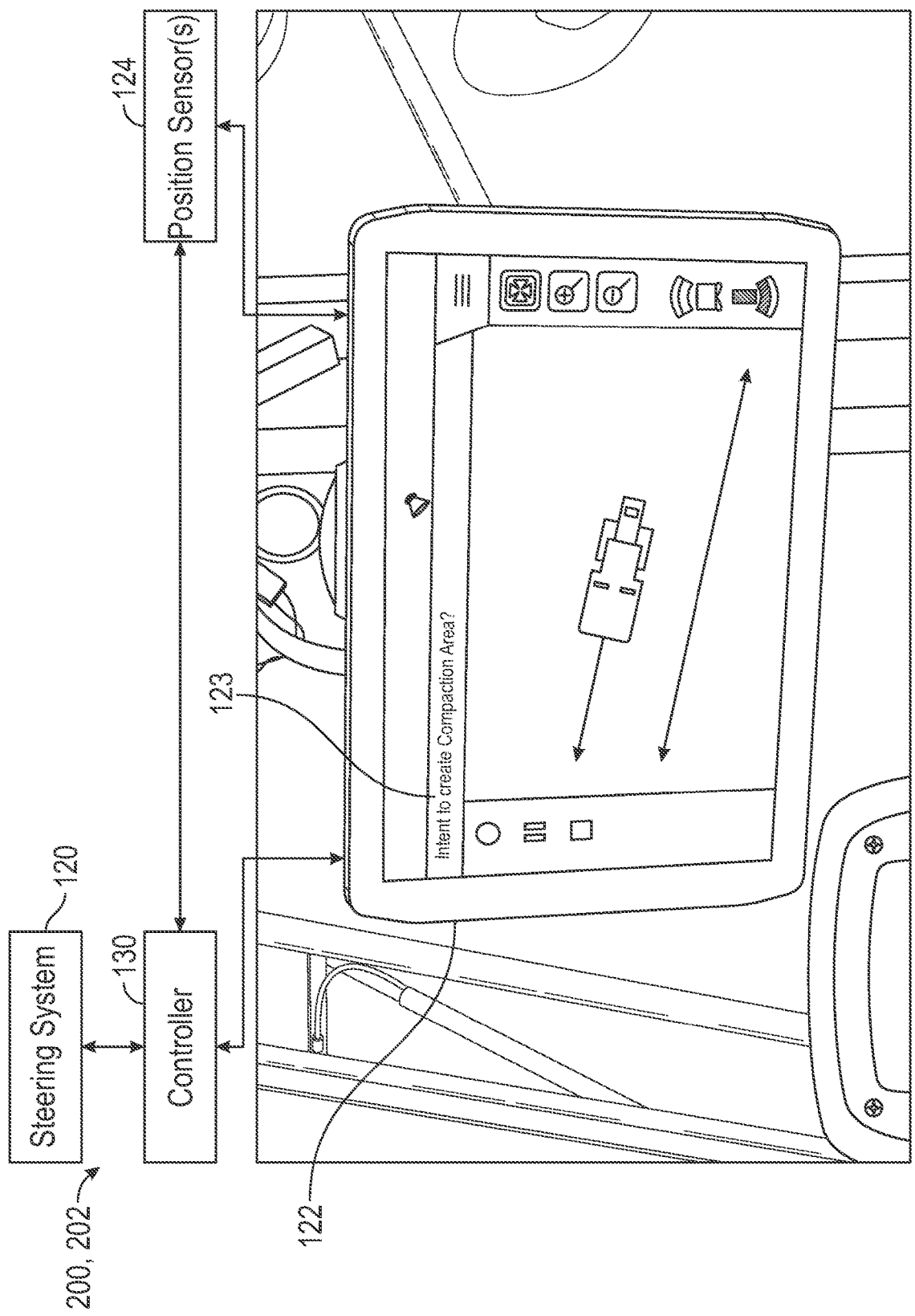
FIGS. 2 and 2A depict a method and a control system of generating a compaction plan for compaction with the compactor in accordance with an example of the present disclosure.

FIG. 2 illustrates aspects of a control system 200 and a method 202 that can be associated with a compactor (such as compactor 100 of FIG. 1). The control system 200 and/or the method 202 can determine operator intent to create a compaction area via position data (and possibly other data) gathered during operator initiated and controlled operation of the compactor within a worksite.

Using the position data gathered during operator controlled steering operation of the compactor and/or other input, the control system 200 and/or the method 202 can develop one or more compaction plans including at least first a compaction plan for operating the compactor to compact in the compaction area in a manner discussed in more detail below. Aspects such as components of the control system 200 and/or method 202 have already been described in reference to the compactor 100 of FIG. 1.

The control system 200 can include one or more remote servers, processors, or other such computing devices such as the controller 130, the communication device 126 (FIG. 1), the position sensor(s) 124, the steering system 120 and the control interface 122. In some examples, the communication device 126 (FIG. 1), the controller 130 (FIGS. 1 and 2) and/or the control interface 122 can be connected to one another and/or otherwise in communication with one another and with various components such as the one or more position sensors 124 and/or other components of compactor 100 (see discussion above) or offboard components via a network. The network may be a local area network ("LAN"), a larger network such as a wide area network ("WAN"), or a collection of networks, such as the Internet. Protocols for network communication, such as TCP/IP, may be used to implement the network. Although examples are described herein as using a network such as the Internet, other distribution techniques may be implemented that transmit information.

The controller 130 can receive position data from the position sensor(s) 124 including during operator implemented and controlled steering of the compactor. The controller 130 can save the position data in a memory (e.g., the memory 131). The controller 130 can determine from the position data saved in the memory a possible intent by an operator to create a compaction area. The controller 130 can generate a prompt 123 on the operator interface 122 to confirm an actual intent of the operator. Prior to or after the operator confirms actual intent, the controller 130 can generate a compaction plan for autonomously steering the compactor to compact in the compaction area. The compaction plan can based upon the operator implemented steering of the compactor (e.g., at least the position data gathered during operator implemented and controlled steering of the compactor using the steering system 120). The controller 130 can implement the autonomous steering of the compactor within the compaction area according to the compaction plan.

Figure 2A:
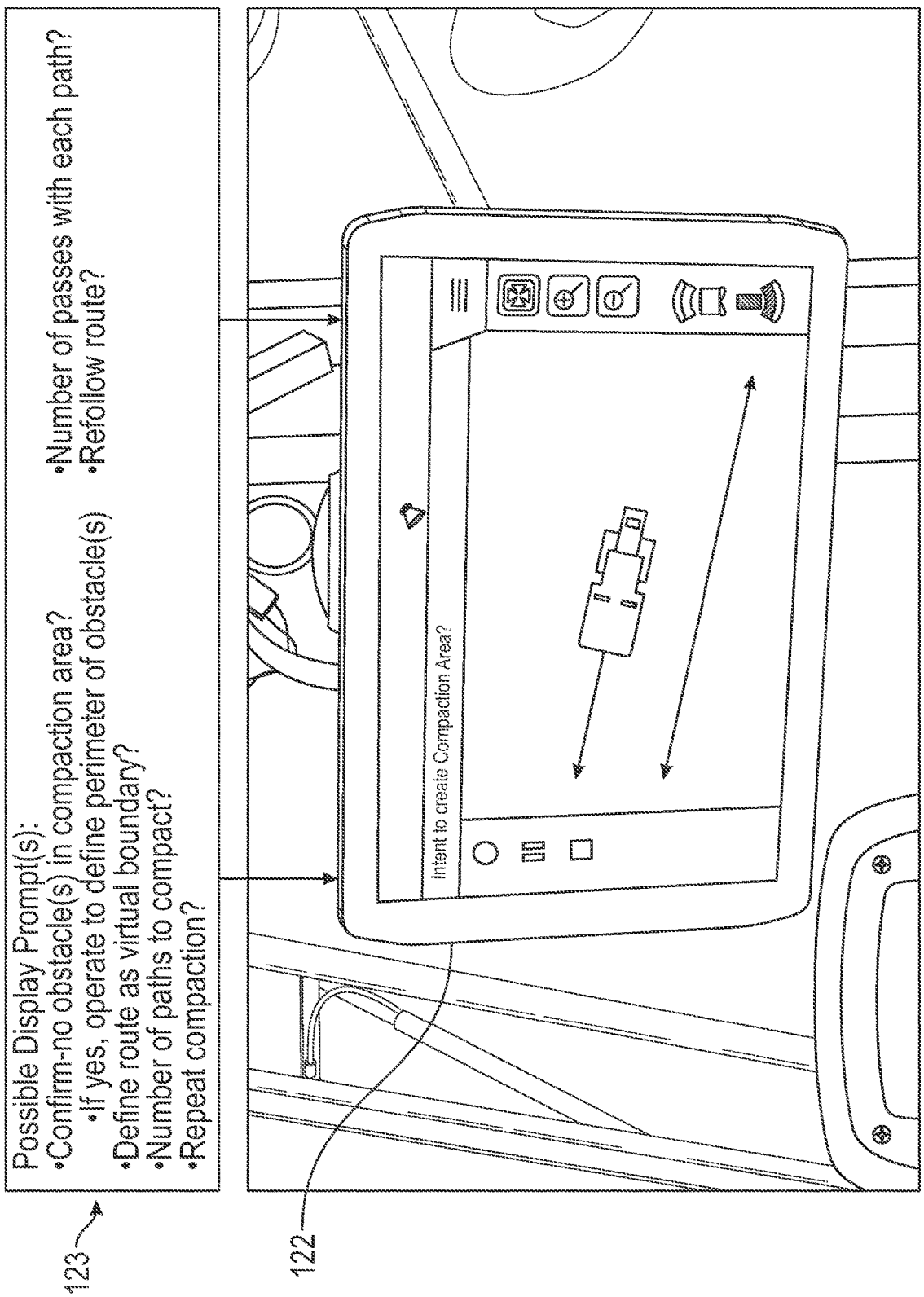

FIG. 2A shows various queries that can be generated for the prompt 123 by the controller 130 (FIGS. 1 and 2) as part of generating and implementing a compaction plan. Thus, the prompt 123 can have multiple queries to the operator regarding desired operation criteria, safety related criteria such as presence or absence of obstacles, etc.

FIGS. 3-7A depict various aspects of the control system 200 and the method 202 of FIG. 2 performing various functions. FIGS. 3-7A merely provide examples of various operator controlled compaction path(s) and compaction plan(s) generated as a result of such compaction path(s). The examples provided are merely exemplary. Thus, the compaction plan(s) need not include certain aspects such as a virtual boundary, plan for full compaction of the area or the like according to some examples. The compaction plan(s) may be limited to a repeat of a path (second pass) according to some examples. The compaction plan(s) may include further or different criteria than those described herein.

The control system 200 and the method 202 can, in the context of software, include steps that represent computer-executable instructions stored in memory. When such instructions are executed by, for example, the controller 130, such instructions cause the controller 130 (FIGS. 1 and 2), various components of control system 200, and/or compactor, generally, to perform operations. The computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 202 is described with reference to compactor 100 of FIG. 1 and components of the control system 200.

Figure 3A:
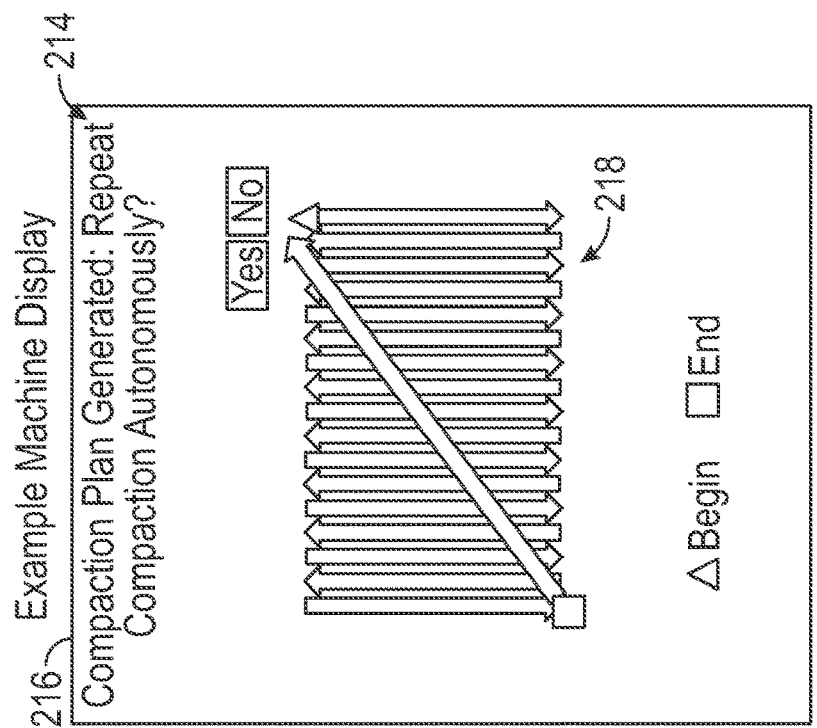
Figure 3:
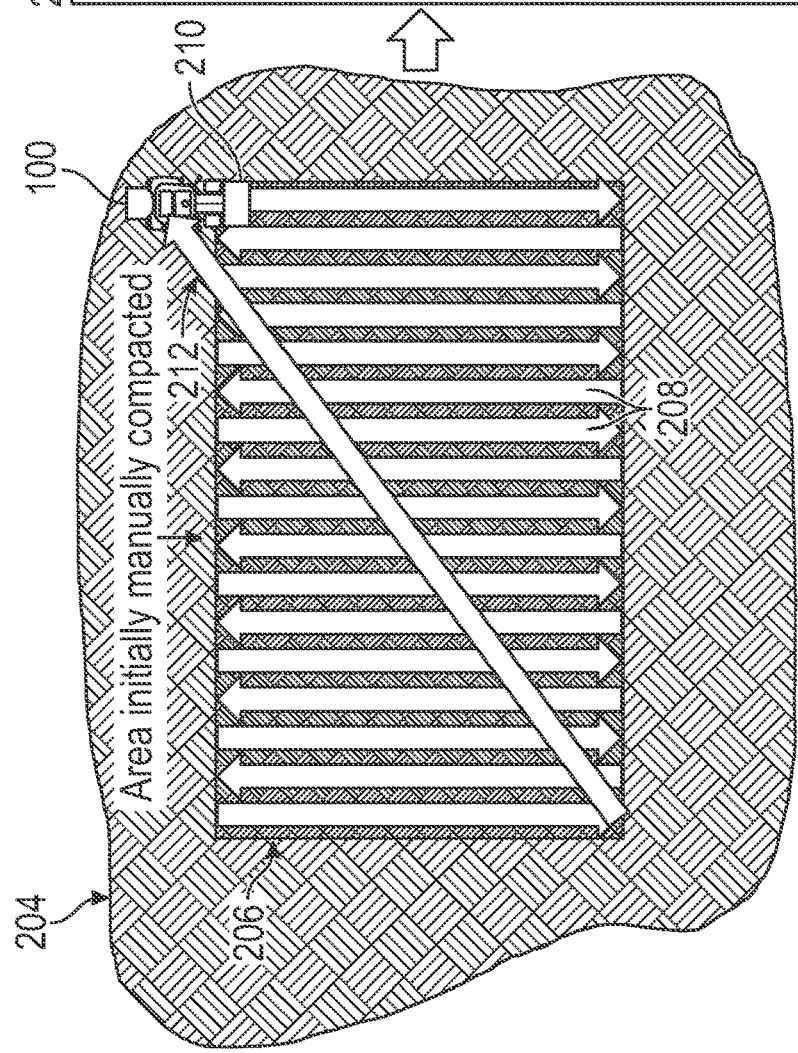

FIG. 3 shows a worksite 204 with a compaction area 206. The compactor 100 has made a number of compaction paths 208 (indicated by arrows) back and forth across the compaction area 206 with the compactor 100 steered by the operator during such operation. At completion of compaction, the operator steers the compactor 100 to return to a same position 210 where compaction commenced (return path to the same position 210 shown by arrow 212). Upon reaching the same position 210, the controller 130 (FIGS. 1 and 2) can determine from the position data saved in the memory a possible intent by the operator to create the compaction area 206. This position data can indicate the return to the same position 210, return to the same position 210 within a certain time period (e.g., one that is feasible to perform compacting and is not therefore too short or too long), etc. Other criteria other than position data such as time data (example provided above), velocity data, vibration data, relative position data (position relative to a known point or points) could also be used as criteria for determining possible intent by the operator to create a compaction area.

As shown in FIG. 3A, in response to the return to the same position 210 (FIG. 3), the controller 130 (FIGS. 1 and 2) can generate a prompt 214 on an operator interface 216 to confirm an actual intent of the operator. The prompt 214 can include one or more queries, an exemplary query to "Repeat Compaction Autonomously" is shown in FIG. 3A. If the operator confirms actual intent was to create the compaction area 206, the controller 130 can generate a compaction plan 218 for autonomously steering the compactor to compact in the compaction area. The compaction plan 218 could also be generated prior to the confirmation of actual intent and could be presented to the operator for review as part of the confirmation of actual intent. The compaction plan 218 can be displayed to the operator on the operator interface 216 for review and approval. As discussed, the compaction plan 218 can based at least in part upon the operator implemented/controlled steering of the compactor (e.g., at least in part on the position data gathered during operator implemented and controlled steering of the compactor using the steering system). The controller 130 (FIGS. 1 and 2) with operator approval can implement the autonomous steering of the compactor 100 within the compaction area according to the compaction plan 218.

Figures 4, 4A:
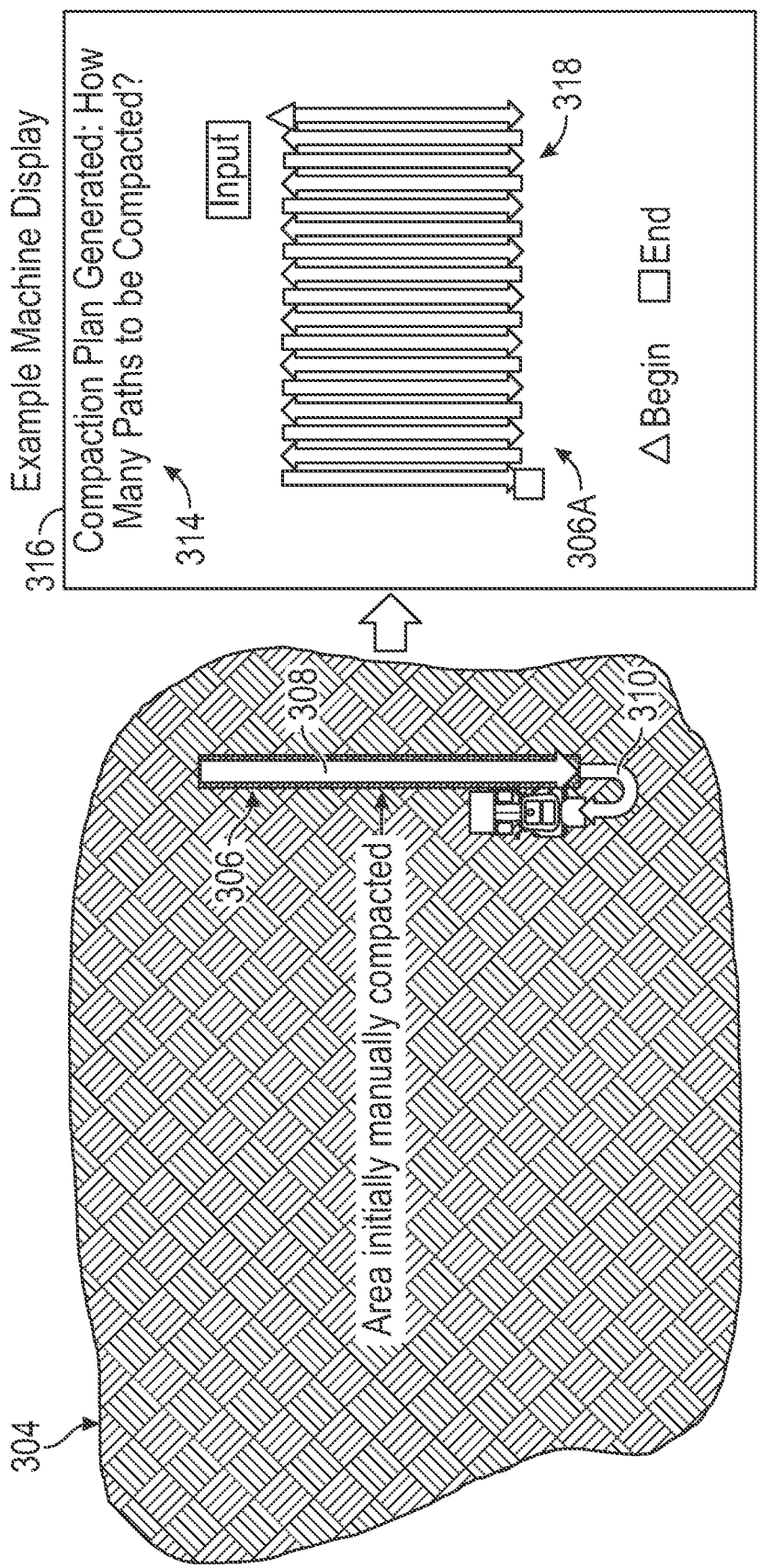

FIG. 4 shows an alternative trigger for the controller 130 (FIGS. 1 and 2) to determine from the position data saved in the memory a possible intent by the operator to create the compaction area. FIG. 4 shows a worksite 304 with a compaction area 306 where the operator has just begun compaction by doing a single pass along a path 308. The operator than has steered the compactor 100 to make turn 310 (having a radius less than a predetermined amount). Turn 310 is merely exemplary and could also be an S-turn or K-turn (with vibration turned off), or a series of turns in order to begin a second path across the worksite 304 in a return direction substantially parallel with the path 308. For the purposes of this disclosure various turns or series of turns are simply called a "turn" for simplicity. The turn 310 or a return to a substantially parallel position with but directly adjacent the path 308 can cause the controller 130 (FIGS. 1 and 2) to determine from the position data saved in the memory a possible intent by the operator to create a compaction area 306A (illustrated in FIG. 4A that is larger than the compaction area 306 already created in FIG. 4).

As shown in FIG. 4A, in response to the turn 310 or a return to a substantially parallel position with but directly adjacent the path 308 (FIG. 4), the controller 130 (FIGS. 1 and 2) can generate a prompt 314 on an operator interface 316 to confirm an actual intent of the operator. The prompt 314 can include one or more queries, an exemplary query "How Many Paths to Be Completed" is shown in FIG. 4A with input for operator. If the operator confirms actual intent was to create the compaction area 306A, the controller 130 can generate a compaction plan 318 for autonomously steering the compactor to compact in the compaction area 306A. The example of FIG. 4A can differ from FIG. 3A in that feedback from the operator as to a number of passes and/or number of paths desired could be utilized in creating the compaction area 306A. As discussed previously, the compaction plan 318 could also be created prior to the confirmation of actual intent. The compaction plan 318 can be displayed to the operator on the operator interface 316 for review and approval. As discussed, the compaction plan 318 can based at least in part upon the operator implemented steering of the compactor (e.g., at least in part on the position data gathered during operator implemented and controlled steering of the compactor using the steering system). The controller 130 (FIGS. 1 and 2), with operator approval, can implement the autonomous steering of the compactor within the compaction area 306A according to the compaction plan 318.

FIG. 5 shows an example similar to that of FIG. 4. FIG. 5 shows a worksite 404 with a compaction area 406 where the operator has just begun compaction by doing a single pass along a path 408. The operator than has steered the compactor 100 to stop and/or has begun to reverse 410 (indicated by smaller arrow) in order to begin as second pass across the worksite 404 in a return direction substantially over that of path 408. The stop and/or reverse over the path 408 can cause the controller 130 (FIGS. 1 and 2) to determine from the position data saved in the memory a possible intent by the operator to create a compaction area 406A (illustrated in FIG. 4A that is larger than the compaction area 406 already created).

As shown in FIG. 5A, in response to the stop and/or the reverse over the path 408 (FIG. 4), the controller 130 (FIGS. 1 and 2) can generate a prompt 414 on an operator interface 416 to confirm an actual intent of the operator. The prompt 414 can include one or more queries, an exemplary query "How Many Paths Having Two Passes to Be Completed" is shown in FIG. 5A. If the operator confirms actual intent was to create the compaction area 406A, the controller 130 can generate a compaction plan 418 for autonomously steering the compactor to compact in the compaction area 406A. The example of FIG. 5A can differ from FIG. 3A in that feedback from the operator as to a number of passes and/or number of paths desired could be utilized in creating the compaction area 406A. This compaction plan 418 can be displayed to the operator on the operator interface 416 for review and approval.

Figures 6, 6A:
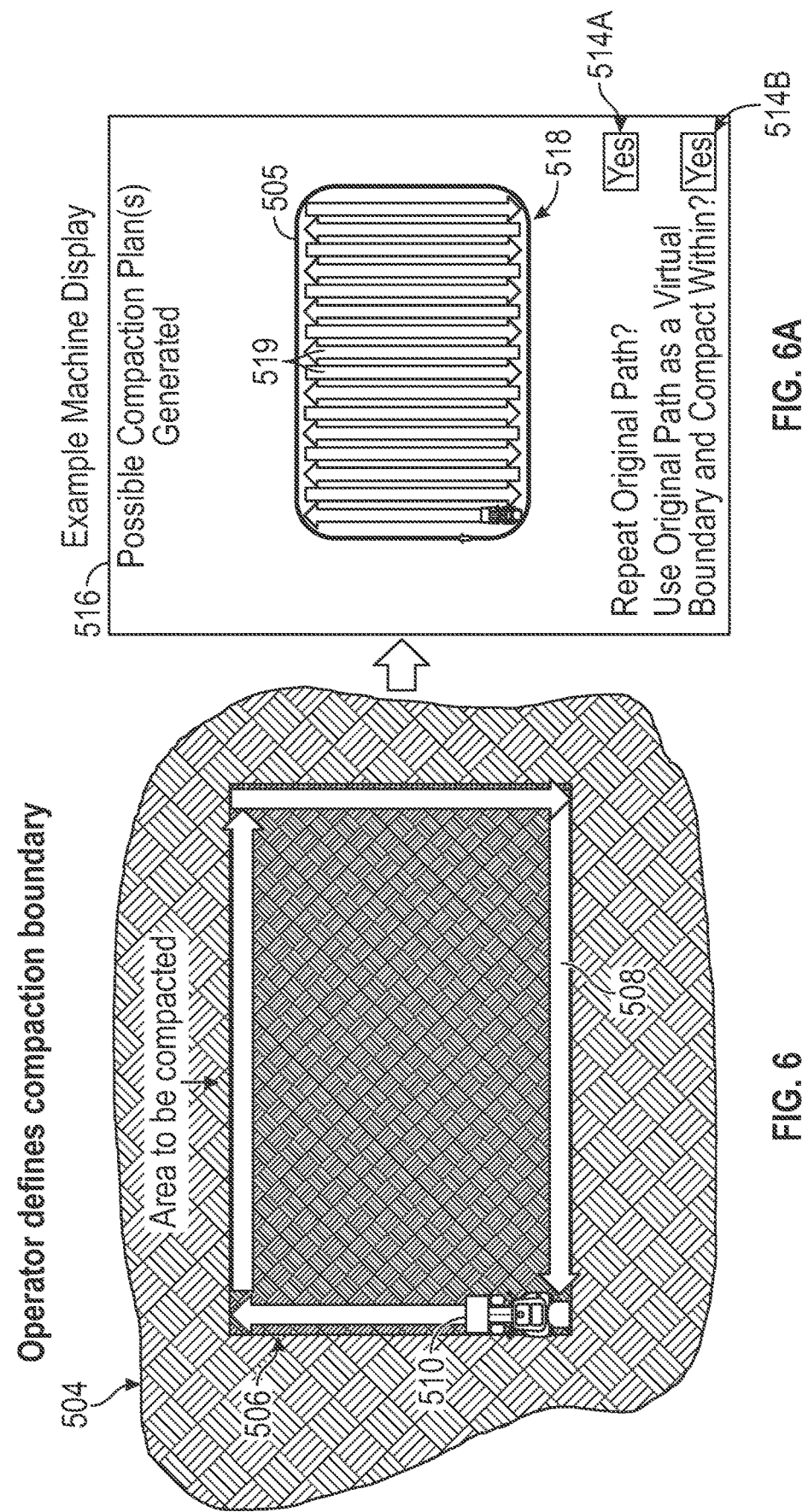

FIG. 6 show an example similar to FIG. 3. FIG. 6 shows a worksite 504 with a compaction area 506. The compactor 100 has made a circuit around the compaction area 506 with the compactor 100 steered by the operator during such operation. At completion of compaction the operator steers the compactor 100 to return to substantially a same position 510 where compaction commenced (return path to the same position 510 shown arrows 508). Upon reaching the same position 510, the controller 130 (FIGS. 1 and 2) can determine from the position data saved in the memory a possible intent by the operator to create the compaction area 506. This position data can indicate return to the same position 510, return to the same position 510 within a certain time period (e.g., one that is feasible to perform compacting and is not therefore to short or too long), etc. Other criteria other than position data such as time data (example above), velocity data, vibration data, relative position data (position relative to a known point or points) could also be used as criteria for determining possible intent by the operator.

As shown in FIG. 6A, in response to the return to the same position 510 (FIG. 6), the controller 130 (FIGS. 1 and 2) can generate one or more prompts 514A and 514B on an operator interface 516 to confirm an actual intent of the operator. The prompts 514A and 514B can include one or more queries, an exemplary queries to "Repeat Original Path" or "Use Original Path As A Virtual Boundary And Compact Within" are shown in FIG. 6A. The prompts 514A and 514B are generated to confirm if the actual intent of the operator is to define a desired boundary for the compaction area or to confirm if the actual intent of the operator is to generate a path that should be repeated upon the return of the compactor to a same position. The example of FIG. 6A can differ from FIG. 3A in that feedback from the operator as to actual intent (repeat or define virtual boundary) is utilized in creating the compaction area 506.

If the operator confirms actual intent was to create the compaction area 506 within a virtual boundary 505 (responding yes to the prompt 514B), the controller 130 can generate a compaction plan 518 (note: a second compaction plan would be generated if actual intent was simply to repeat the compaction performed) including the virtual boundary 505 and compaction paths 519 for autonomously steering the compactor to compact in the compaction area 506. The virtual boundary 505 can be generated by the actual path previously taken by manual operation of the compactor and return to substantially the same point. However, the virtual boundary 505 could also be extrapolated and created by a plurality of furthest spaced apart sensed points along a path during the operator implemented steering of the compactor or at least two furthest apart substantially parallel paths during operator implemented steering of the compactor, for example. The compaction plan 518 can be displayed to the operator on the operator interface 516 for review and approval. The controller 130 (FIGS. 1 and 2) with operator approval can implement the autonomous steering of the compactor within the compaction area according to the compaction plan 518.

Figures 7, 7A:
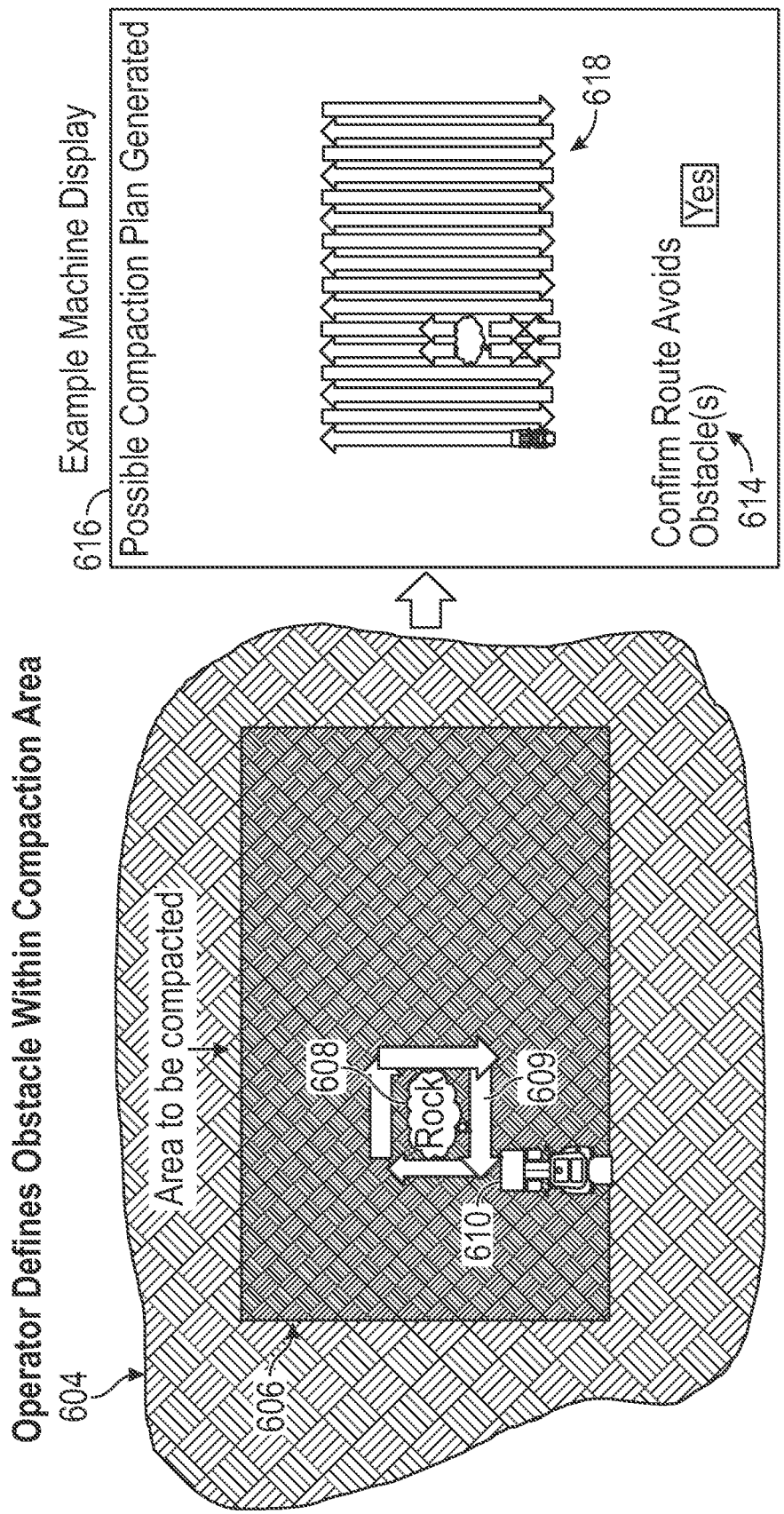

FIG. 7 shows a worksite 604 with a compaction area 606. The compactor 100 under operator controlled steering and as a result of a response to a prompt (see FIG. 2A) to define obstacles within a compaction area 606, made a circuit around an obstacle 608 with the compactor 100 steered by the operator during such operation. This circuit is indicated as a path 609. At completion of such defining the obstacles within the compaction area 606, the operator steers the compactor 100 to return to substantially a same position 610 where compaction commenced, the response to the original prompt was given or the operator indicates via user interface that all obstacles have been defined. Upon such input(s), the controller 130 (FIGS. 1 and 2) can determine from the position data saved in the memory a possible or actual intent by the operator to create the compaction area 606. This position data can indicate return to the same position 610, response to prompt(s), other input such as from obstacle detection sensor, return to the same position 610 within a certain time period, operation for time without vibration after response to initial prompt to define obstacle(s), etc. Other criteria other than position data such as time data (example above), other sensor data (obstacle detection sensors), vibration data, velocity data, operator response data, etc. could also be used as criteria for determining possible intent by the operator.

As shown in FIG. 7A, in response to the return to the same position 610 (FIG. 7), the controller 130 (FIGS. 1 and 2) can generate a prompt 614 on an operator interface 616 to confirm an actual intent of the operator and for operator approval that the obstacles have been properly defined. The prompt 614 can include one or more queries, an exemplary query "Confirm Route Avoids Obstacle(s)" is shown in FIG. 7A. The prompt 614 can be generated to confirm if the actual intent of the operator was to define a desired boundary with the path 609 for the compaction around the obstacle(s). However, the prompt 614 could also be generated for operator information, further operator input, compaction plan approval, etc. If the operator confirms actual intent was to define the obstacle 608 with the path 609 and this defines all obstacles, the controller 130 can generate a compaction plan 618 with compaction paths for autonomously steering the compactor to compact in the compaction area 606 avoiding the obstacle 608 and any other obstacles that are properly defined by the operator during prior steered operation of the compactor. This compaction plan 618 can be displayed to the operator on the operator interface 616 for review and approval. The controller 130 (FIGS. 1 and 2) with operator approval can implement the autonomous steering of the compactor within the compaction area according to the compaction plan 618.

Figure 8A:
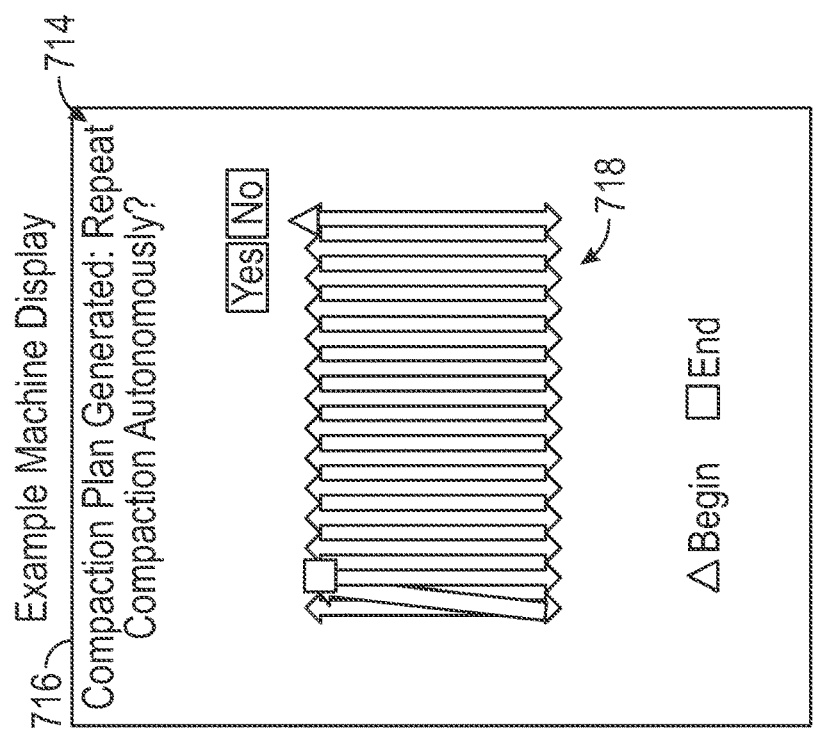
Figure 8:
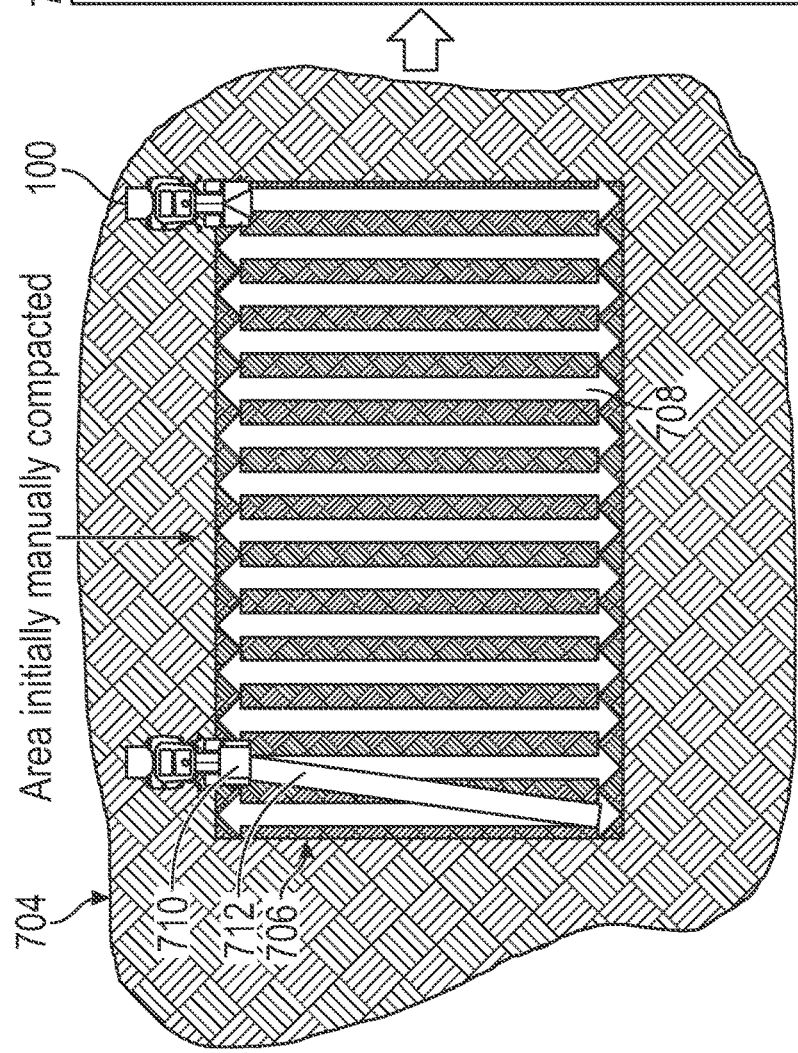

FIG. 8 shows a worksite 704 with a compaction area 706. The compactor 100 has made a number of completed compaction paths 708 (indicated by arrows) each having at least two passes back and forth (hence the double arrows) across the compaction area 706 with the compactor 100 steered by the operator during such operation. At completion of initial compaction, the operator steers the compactor 100 to return to begin compaction over a previous path 710. This previous path 710 was one where compaction had previously been performed with the two passes (return path to the previous path 710 shown by arrow 712). The previous path 710 can be a path that is closer toward an initial compaction path. Hence, the arrow 712 is back from the left to right as viewed in FIG. 8 while the compaction paths 708 (double arrows) were initially built from right to left in FIG. 8. Upon reaching the previous path 710, the controller 130 (FIGS. 1 and 2) can determine from the position data saved in the memory a possible intent by the operator to create the compaction area 706. This position data can indicate the return to the previous path 710, return to the previous path 710 within a certain time period (e.g., one that is feasible to perform compacting and is not therefore too short or too long), etc. Other criteria other than position data such as time data (example provided above), velocity data, vibration data, relative position data (position relative to a known point or points) could also be used as criteria for determining possible intent by the operator to create a compaction area.

As shown in FIG. 8A, in response to the return to the previous path 710 (FIG. 8), the controller 130 (FIGS. 1 and 2) can generate a prompt 714 on an operator interface 716 to confirm an actual intent of the operator. The prompt 714 can include one or more queries, an exemplary query to "Repeat Compaction Autonomously" is shown in FIG. 8A. If the operator confirms actual intent was to create the compaction area 706, the controller 130 can generate a compaction plan 718 for autonomously steering the compactor to compact in the compaction area. The compaction plan 718 could also be generated prior to the confirmation of actual intent and could be presented to the operator for review as part of the confirmation of actual intent. The compaction plan 718 can be displayed to the operator on the operator interface 716 for review and approval. As discussed, the compaction plan 718 can based at least in part upon the operator implemented/controlled steering of the compactor (e.g., at least in part on the position data gathered during operator implemented and controlled steering of the compactor using the steering system). The controller 130 (FIGS. 1 and 2) with operator approval can implement the autonomous steering of the compactor 100 within the compaction area according to the compaction plan 718.

Various examples are provided above that can be used by the controller 130 (FIGS. 1 and 2) to determine possible intent of the operator. These include, but are not limited to a return of the compactor to a same position, a return of the compactor to a same position after a first duration of time, a movement of the compactor within the compaction area (predefined area) for at least a predetermined duration of time, a movement of the compactor for a period of time with vibration, a movement of the compactor in a first direction along a first travel path followed by a stop of the compactor, a turn of the compactor (such as one of less than a predefined radius), a turn having an S-shape or K-shape, and an operation of the compactor in reverse along a path that coincides substantially with a path the compactor had previously traveled, a positioning of the compactor on a path substantially adjacent one already traveled, etc.

Examples of various prompts are provided. The prompts can ascertain actual intent of the operator such that the compaction plan can be generated (and/or the compaction plan can be generated at least in part with response to the prompt(s)). The compaction plan can also be generated prior to ascertaining actual intent of the operator and/or with operator feedback. The compaction plan can include any one or combination of: a virtual boundary, a number of paths of travel for the compactor within the compaction area, a number of passes for each path of travel within the compaction area, a desire to refollow a route of the operator implemented steering of the compactor, a presence of any obstacles within the compaction area, a location of any of the obstacles within the compaction area, etc.

Boundaries, paths, obstacles, etc. can be visually displayed on the control interface as part of the compaction plan indicated with one or more lines, such a parallel lines adjacent the lateral edges of the drum(s). Alternatively, the boundaries, paths, obstacles, etc. can be displayed as bounded by lines or the like. According to further examples, lines or other representation of the boundaries, paths, obstacles, etc. may not be visually displayed. The control interface can include for example, labels, location names, position coordinates of the respective locations, and/or other information associated with the compaction plan, and/or with operation data of the compactor. Data provided by user interface can be displayed and/or updated in real-time to assist the operator in controlling operation of compactor. The control interface can depict a stage or mode of operation in which the travel path(s) associated with the compaction plan has been determined to be completed. This can be provided for reference to the operator. The compaction plan can include visual indicia indicating, among other things, the virtual boundary, the one or more travel paths, pass count, a speed of compactor, a vibration frequency of the one or more drums, a vibration amplitude of one or more drums, and/or other operating parameters of compactor. In such examples, visual indicia could also indicate one or more other operating parameters.

The controller can cause control interface to display one or more messages for the operator of compactor. For example, the controller via the control interface can display a message requesting that the operator approve the compaction plan. The operator can approve/disapprove of various compaction plans, travel paths, virtual boundaries, compaction areas, or other criteria (speed, vibration, etc.) via the control interface. The controller may also cause the control interface to display warnings, message or other indicia with one or more buttons, icons, and/or other data fields. Such data fields may comprise, for example, portions of the touch screen display, and/or other components of the control interface configured to receive input (e.g., touch input) from the operator as previously illustrated in FIGS. 2-8A, for example. It is understood that various other controls of the compactor such as the braking, throttle, etc. may also be used and can receive inputs from the controller 130 (FIGS. 1 and 2) in performing the compaction plan. In yet further examples, the control interface and/or other components of compactor may be configured to receive inputs such as from obstacle, vibration and other sensors. In some examples, the controller can cause the control interface to display one or more additional warnings such as via buttons, icons, and/or other controls as desired.

Figure 9:
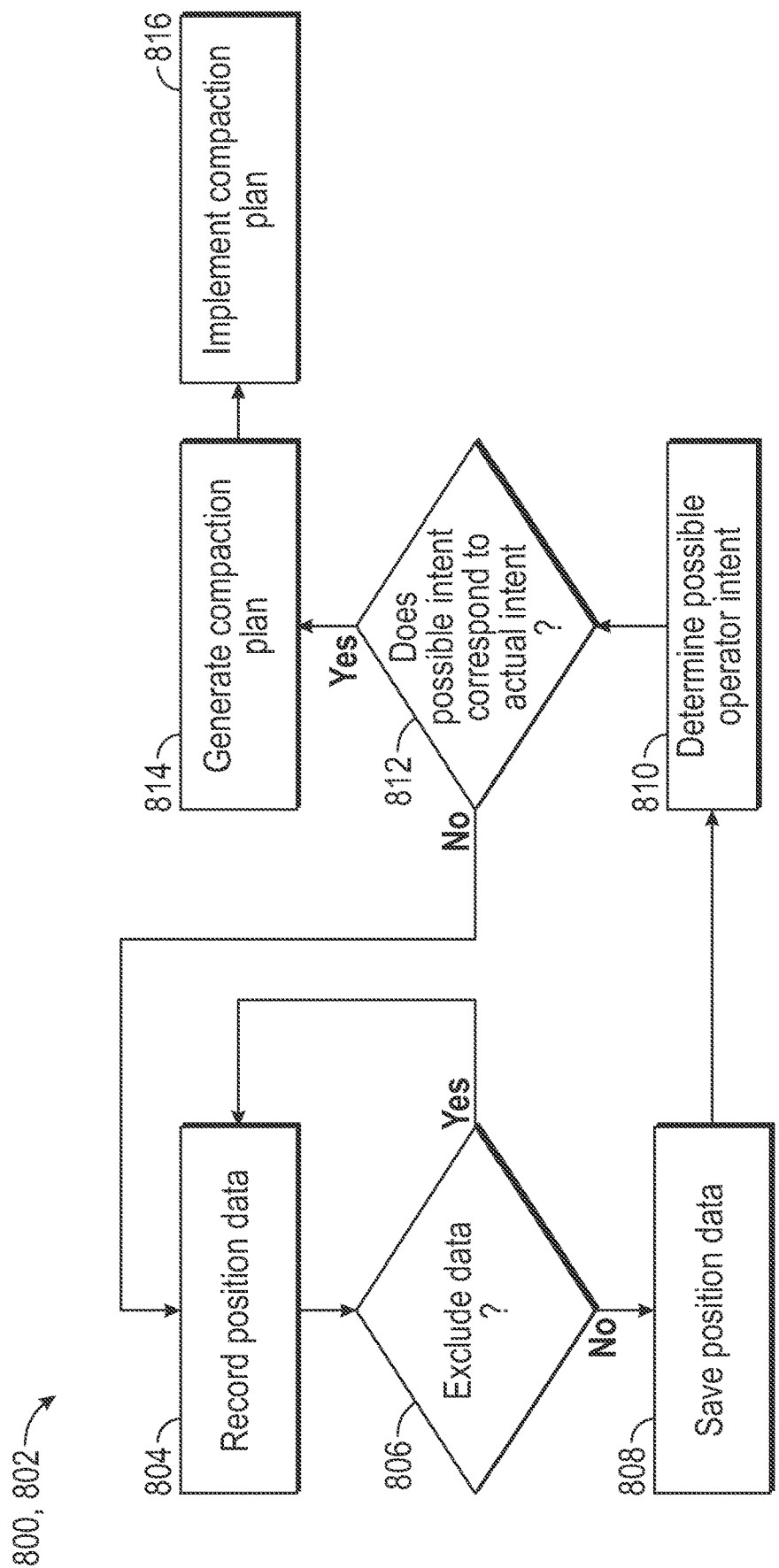
FIG. 9 is a flow diagram used by a method and/or control system that generates the compaction plan in accordance with an example of the present disclosure.

FIG. 9 shows a flow diagram such as for a system or method similar to those previously discussed. The system 800 or method 802 can record position data of a compactor during manually controlled operation 804. According to some examples, some of the position data that is recorded can be excluded from analysis to determine operator intent. Thus, the system 800 or method 802 can exclude some position data at step 806. The criteria for exclusion can be on the basis data segmentation, for example. Thus, the controller 130 (FIGS. 1 and 2) can be configured to segment the position data (before or after being saved in memory) based at least upon one of time, position relative to reference point, presence or absence of vibration and/or velocity of the compactor, for example. Velocity can distinguish between non-compacting movement of the compactor and possible compacting related movement of the compactor. The data regarding the possible compacting related movement (speed) along with other data regarding the compactor can be used to determine the possible intent by the operator to create the compaction area.

The system 800 or method 802 can save data 808 and can include determining 810 the possible operator intent to compact. The possible intent to compact can be determined 812 to correspond to an actual intent on the part of the operator to compact. This actual intent can be confirmed via the prompt(s) discussed. The system 800 or method 802 can generate 814 a compaction plan and can implement 816 the compaction plan including autonomous steering of the compactor during compaction.

INDUSTRIAL APPLICABILITY

The present disclosure provides apparatuses such as compactor 100, systems such as control systems 200, 800 and methods 202, 802 for ascertaining a possible intent by an operator to compact, confirming such intent, generating a compaction plan and implementing the compaction plan including autonomous steering of the compactor during compaction. The possible intent can be ascertained at least in part by the operators steered behaviors as evidenced by position data and/or other data. The position data from operator controlled steering can be used by a controller such as the controller 130 to ascertain possible intent, generate the compaction plan, etc.

The systems such as the control systems 200, 800 and methods such as methods 202 and 802 can rely on operator behavior in steering the compactor (as evidenced by position data and/or other data) or other input (e.g., operator input, sensor data such as regarding vibration, velocity, time or obstacles). The systems such as the control systems 200, 800 and methods 202, 802 can formulate a plurality of compaction plans, and thus, are not limited to a single scheme or merely refollowing a route already taken. Compaction plans can be revised/recreated/updated to a new compaction plan in response to the operator (and/or sensors such as one or more obstacle detection sensors, vibration sensors, etc.) input.

As a result, the systems such as the control systems 200, 800 and methods such as methods 202, 802 compaction can be performed in an automated manner that can be more precise than could otherwise be performed by a human operator. Thus, human error can be reduced.

The above detailed description is intended to be illustrative, and not restrictive. The scope of the disclosure should, therefore, be determined with references to the appended claims, along with the full scope of equivalents to which such claims are entitled.

What is claimed is:

1. A control system for a compactor comprising:
a position sensor sensing a position of the compactor;
a steering system configured for both operator implemented steering and autonomous steering of the compactor;
a controller in communication with at least the steering system and the position sensor, wherein the controller is configured to:
receive position data from the position sensor including during the operator implemented steering of the compactor;
save the position data to a memory;
determine from the position data saved in the memory a possible intent by an operator to create a compaction area;
generate a prompt on an operator interface to confirm an actual intent of the operator;
generate a compaction plan for autonomously steering the compactor to compact in the compaction area, wherein the compaction plan is based at least partially upon the operator implemented steering of the compactor; and
implement the autonomous steering of the compactor within the compaction area according to the compaction plan;

wherein the possible intent by the operator to create the compaction area is determined from the position data that is one or more of: a return of the compactor to a path previously compacted, a movement of the compactor in a first direction along a first travel path followed by a stop of the compactor, a turn of the compactor of less than a predefined radius, a turn with vibration turned off and an operation of the compactor in reverse along a path that coincides substantially with a path the compactor had previously traveled.

2. The control system of claim 1, wherein the prompt on the operator interface is generated to confirm if the actual intent of the operator is to define a desired boundary for the compaction area or to confirm if the actual intent of the operator is to generate a path that should be repeated upon the return of the compactor to a same position.

3. The control system of claim 1, wherein the controller is configured to segment the position data based at least upon one of time, position relative to reference point or velocity of the compactor to distinguish between non-compacting movement of the compactor and possible compacting related movement of the compactor, wherein data regarding the possible compacting related movement of the compactor is used to determine the possible intent by the operator to create the compaction area.

4. The control system of claim 1, wherein the sensing the position data regarding the position of the compactor is captured substantially continuously in real-time.

5. The control system of claim 1, wherein the compaction plan is generated at least in part by a response of the operator to the prompt on the operator interface, wherein the prompt asks the operator to define one or more criteria including one or more of: a virtual boundary, a number of paths of travel for the compactor within the compaction area, a number of passes for each path of travel within the compaction area, a desire to refollow a route of the operator implemented steering of the compactor, a presence of any obstacles within the compaction area and a location of any of the obstacles within the compaction area.

6. The control system of claim 1, wherein the compaction plan includes at least one of a virtual boundary and a number of paths of travel for the compactor.

7. The control system of claim 6, wherein the virtual boundary is determined from at least one of: a plurality of furthest spaced apart sensed points along a path during the operator implemented steering of the compactor or at least two furthest apart substantially parallel paths during the operator implemented steering of the compactor.

8. The control system of claim 1, wherein the controller is configured to:
associate the position data with time data regarding when the position data was sensed; save the position data and the time data to the memory;
determine from the position data and the time data saved in the memory the possible intent by the operator to create the compaction area based upon the operator implemented steering of the compactor;
wherein the possible intent by the operator to create the compaction area is determined by one or more of:
a return of the compactor to a same position after a first duration of time and a movement of the compactor within the compaction area for at least a predetermined duration of time.

9. A machine implemented method of controlling operation of a compactor, comprising:
recording a position of the compactor while operating the compactor to manually steer along a path;
determining, with an electronic controller, a possible intent by an operator to create a compaction area using the recording of the position;
confirming an actual intent of the operator;
generating, with the electronic controller, a compaction plan for autonomously steering the compactor to compact in the compaction area, wherein the compaction plan is based at least partially upon the recording of the position of the compactor; and
implementing, with the electronic controller, the autonomous steering of the compactor within the compaction area according to the compaction plan;
wherein the position used in the determining the possible intent by the operator is one or more of: a return of the compactor to a path previously compacted, a movement of the compactor in a first direction along a first travel path followed by a stop of the compactor, a turn of the compactor of less than a predefined radius, a turn with vibration turned off and an operation of the compactor in reverse along a path that coincides substantially with a path the compactor had previously traveled.

10. The method of claim 9, wherein confirming the actual intent of the operator includes querying the operator to determine if the actual intent was to define a desired boundary for the compaction area or to determine if the actual intent of the operator is to generate a path that should be repeated upon the return of the compactor to a same position.

11. The method of claim 9, wherein generating the compaction plan is based at least in part by a response of the operator to a prompt on an operator interface, wherein the prompt asks the operator to define one or more criteria including one or more of:
a virtual boundary, a number of paths of travel for the compactor within the compaction area, a number of passes for each path of travel within the compaction area, a desire to refollow a route of the operator implemented steering of the compactor, a presence of any obstacles within the compaction area and a location of any of the obstacles within the compaction area.

12. The method of claim 9, wherein the operator must respond to one or more prompts regarding the actual intent of the operator for the compaction plan to be generated.

13. A compactor comprising:
a substantially cylindrical drum configured to compact a surface as the compactor traverses a compaction area;
a frame supporting the drum;
a steering system configured for both operator implemented steering and autonomous steering of the compactor;
a position sensor sensing a position of the compactor; and
a controller in communication with at least the steering system and the position sensor, wherein the controller is configured to:
receive position data from the position sensor including during the operator implemented steering of the compactor;
save the position data to a memory;
determine from the position data saved in the memory a possible intent by an operator to create the compaction area;
generate a prompt on an operator interface to confirm an actual intent of the operator;
generate a compaction plan for autonomously steering the compactor to compact in the compaction area, wherein the compaction plan is based at least partially upon the operator implemented steering of the compactor; and implementing the autonomous steering of the compactor within the compaction area according to the compaction plan;

wherein the possible intent by the operator to create the compaction area is determined by one or more of: a movement of the compactor in a first direction along a first travel path followed by a stop of the compactor, a turn of the compactor of less than a predefined radius, a turn with vibration turned off and an operation of the compactor in reverse along a path that coincides substantially with a path the compactor had previously traveled.

14. The compactor of claim 13, wherein the prompt on the operator interface is generated to confirm if the actual intent of the operator is to define a desired boundary for the compaction area or to confirm if the actual intent of the operator is to generate a path that should be repeated upon the return of the compactor to a same position.

15. The compactor of claim 13, wherein the compaction plan is generated at least in part by a response of the operator to the prompt on the operator interface, wherein the prompt asks the operator to define one or more criteria including one or more of: a virtual boundary, a number of paths of travel for the compactor within the compaction area, a number of passes for each path of travel within the compaction area, a desire to refollow a route of the operator implemented steering of the compactor, a presence of any obstacles within the compaction area and a location of any of the obstacles within the compaction area.

16. The compactor of claim 13, wherein the compaction plan includes at least one of a virtual boundary and a number of paths of travel for the compactor.

17. The compactor of claim 16, wherein the virtual boundary is determined from at least one of: a plurality of furthest spaced apart sensed points along a path during the operator implemented steering of the compactor or at least two furthest apart substantially parallel paths during the operator implemented steering of the compactor.

* * * * *